United States Patent [19]
Forest

[11] Patent Number: 5,367,362
[45] Date of Patent: Nov. 22, 1994

[54] ELECTRONIC REPRODUCTION APPARATUS AND METHOD WITH CHECK FOR IMPROPER DOCUMENT FEED

[75] Inventor: Paul H. Forest, Rochester, N.Y.

[73] Assignee: Eastman Kodak Company, Rochester, N.Y.

[21] Appl. No.: 99,112

[22] Filed: Jul. 28, 1993

[51] Int. Cl.$^5$ ............... G03G 15/00; G03G 21/00
[52] U.S. Cl. ............... 355/208; 355/202; 355/204; 355/321; 377/8
[58] Field of Search ............... 355/308, 316, 321, 203, 355/204, 208; 358/300, 498, 437, 296; 377/8

[56] References Cited

U.S. PATENT DOCUMENTS

| | | | |
|---|---|---|---|
| 4,076,408 | 2/1978 | Reid et al. | |
| 4,128,756 | 12/1978 | Nagano et al. | 355/308 X |
| 4,908,660 | 3/1990 | Ohira et al. | 355/308 X |
| 4,922,350 | 5/1990 | Rombola et al. | 358/488 |
| 4,949,190 | 8/1990 | Thompson | 358/426 |
| 5,003,627 | 3/1991 | Wataya et al. | 355/308 X |
| 5,109,252 | 4/1992 | Schott, Jr. | 355/202 |
| 5,124,798 | 6/1992 | Tanabe et al. | 358/296 |
| 5,126,759 | 6/1992 | Small et al. | 346/107 R |

Primary Examiner—Matthew S. Smith
Attorney, Agent, or Firm—Norman Rushefsky

[57] ABSTRACT

An electronic copier includes an automatic document feeder for feeding original document sheets to be copied to an electronic image scanner or reader. During movement of the documents for reading, a count is generated of the number of original document sheets in a copy job. A check of the number of originals in the copy job may be requested and performed by a second feeding operation that occurs after the originals are scanned to increase productivity of the apparatus.

20 Claims, 7 Drawing Sheets

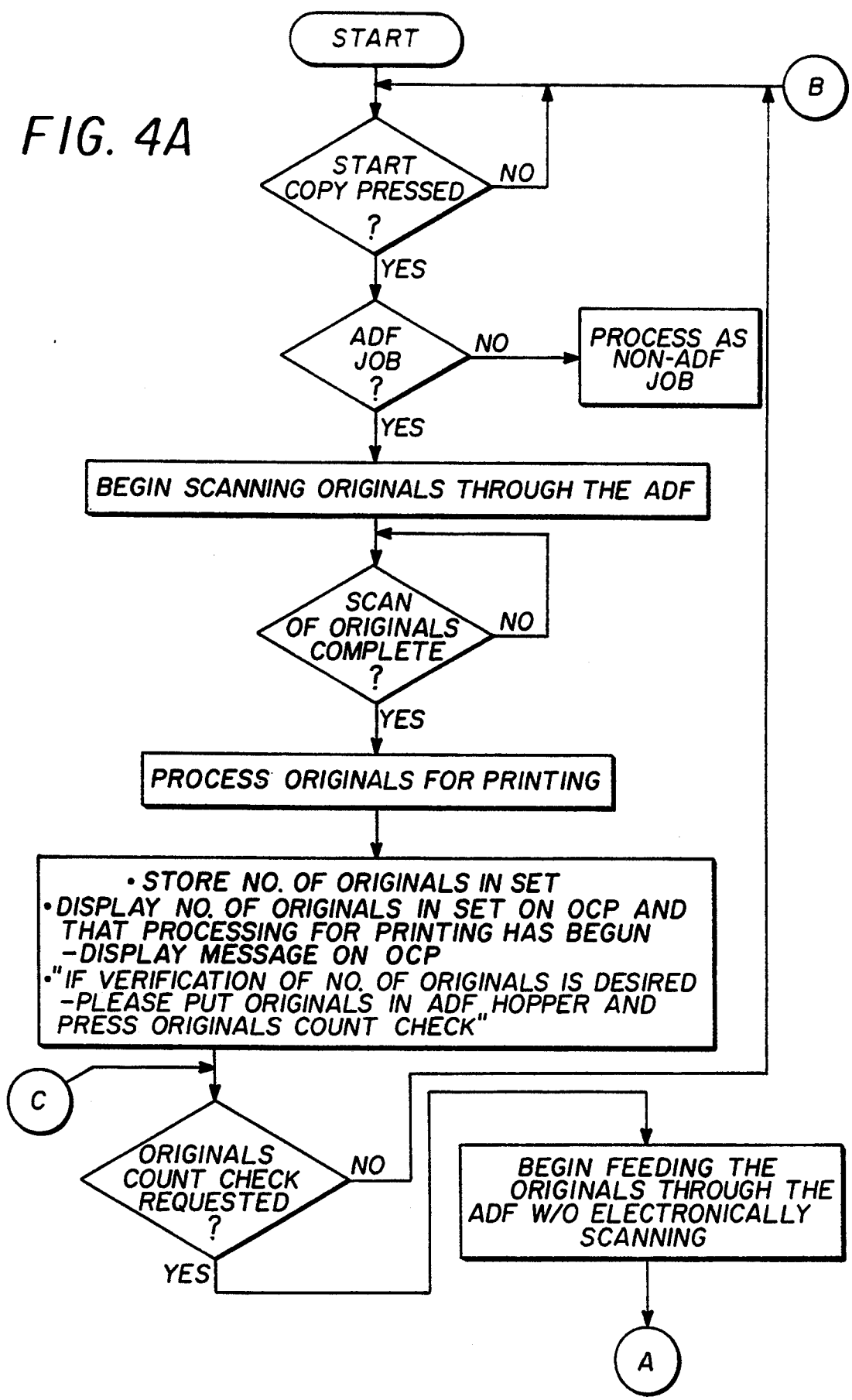

ELECTRONIC REPRODUCTION APPARATUS AND METHOD WITH CHECK FOR IMPROPER DOCUMENT FEED

BACKGROUND OF THE INVENTION

1. Field of the Invention

The present invention relates generally to reproduction apparatus such as electrostatographic copiers and methods for using same, and more particularly, to electronic reproduction apparatus and methods for making collated sets of reproductions.

2. Brief Description of the Prior Art

As noted in U.S. Pat. No. 4,076,408, it is well known in the prior art to provide convenience copiers with document feeders that present the individual document sheets to the copier, one-after another, in a manner suitable for producing collated copies without a sorter.

In the apparatus described in the above-referenced patent, the origin comprising a set of individual sheets, is circulated and recirculated for presentation to the apparatus, one sheet after another for copying. A problem with such apparatus is that during a recirculation, two sheets may stick together and only a copy of one of them will be made for that document set. To overcome this problem, the prior art proposes that multiple feeds are detected by comparing the number of presentations during a circulation with a number of presentations during a recirculation and some further action is taken such as shutdown of the feeder, whenever the number of presentations on circulation and recirculation differ. Typically, in such copiers, a preliminary circulation is made to detect the number of originals and then one or more production, i.e., copying, recirculations are made to form collated copy sets of the original.

An improvement in copying can be provided by using electronic collated copiers such as described in U.S. Pat. No. 4,949,190. In such electronic copiers, image data is "read" by scanning an original with an electronic scanner so that optical image information on the original is converted to a stream of electronic video or image data. The video data may be stored in multipage buffer memories. When a plurality of copy sets of a multi-page document are to be produced as a copy job, the stored video data for each page are repeatedly sent to the printer in proper page order such that the reproduction sets are automatically collated without use of a sorter.

A disadvantage of this approach is that the specific number of originals in the set must be fed and scanned correctly. The use of a prescan count is generally undesirable because misfeeds are not usually encountered and when requested, serves to tie up the machine while other users are waiting in line to use the machine.

It is therefore an object of the invention to overcome the above problem and provide a copier with improved productivity, yet provide some assurance to an operator that a misfeed has not occurred.

SUMMARY OF THE INVENTION

The above and other objects of the invention which will become apparent upon reading the specification are realized by a copier apparatus for producing copies of an original multisheet document set, the apparatus comprising means for inputting parameters for reproduction of the document set as a copy job; means for feeding document sheets from said set seriatim to an image reader means and then to a storage hopper during a first sheet feeding operation; means responsive to said feeding for counting the sheets a first time and for providing a first count of the number of document sheets counted in said document set during the first sheet feeding operation; image reader means operative during the first sheet feeding operation for convening optical information on the document sheets to electronic image data; means for processing the data for printing; means for printing the data on copy sheets; and means for feeding the document sheets during a second sheet feeding operation; means for counting the sheets in said document set during said second sheet feeding operation and for generating a second count without reading of image information on the document sheets during said second sheet feeding operation.

The invention also provides a method for operating a copier apparatus for producing copies of an original multisheet document set, the method comprising the steps of:

establishing parameters for reproduction by said apparatus of the document set as a copy job; feeding document sheets from said set seriatim to an image reader and then to a storage hopper during a first sheet feeding operation; operating the apparatus so that the apparatus counts the sheets a first time and provides a display indicating a first count of the number of document sheets counted in said document set during the first sheet feeding operation; during the first sheet feeding operation reading optical image information on the document sheets and converting the optical information read to electronic image data; processing the data for printing by the apparatus; printing the data on copy sheets; and feeding the document sheets during a second sheet feeding operation; operating the apparatus so that the apparatus counts the sheets in said document set during said second sheet feeding operation and generates a second count without reading of image information on the document sheets during said second sheet feeding operation.

BRIEF DESCRIPTION OF THE DRAWINGS

In the detailed description of the preferred embodiments of the invention presented below, reference is made to the accompanying drawings in which:

FIGS. 4A and 4B illustrate a flowchart for operation of the copier apparatus of FIG. 1 in accordance with one embodiment of the method and apparatus of the invention.

DETAILED DESCRIPTION OF THE PREFERRED EMBODIMENTS

The preferred embodiments are described herein with reference to an electrophotographic copier, but it will be understood that the invention can be used in any form of black and white or color electronic copier. The description will be directed in particular to elements forming part of, or cooperating more directly with, apparatus in accordance with the present invention. It is to be understood that elements not specifically shown or described may take various forms well known to those skilled in the art.

Figure 1:
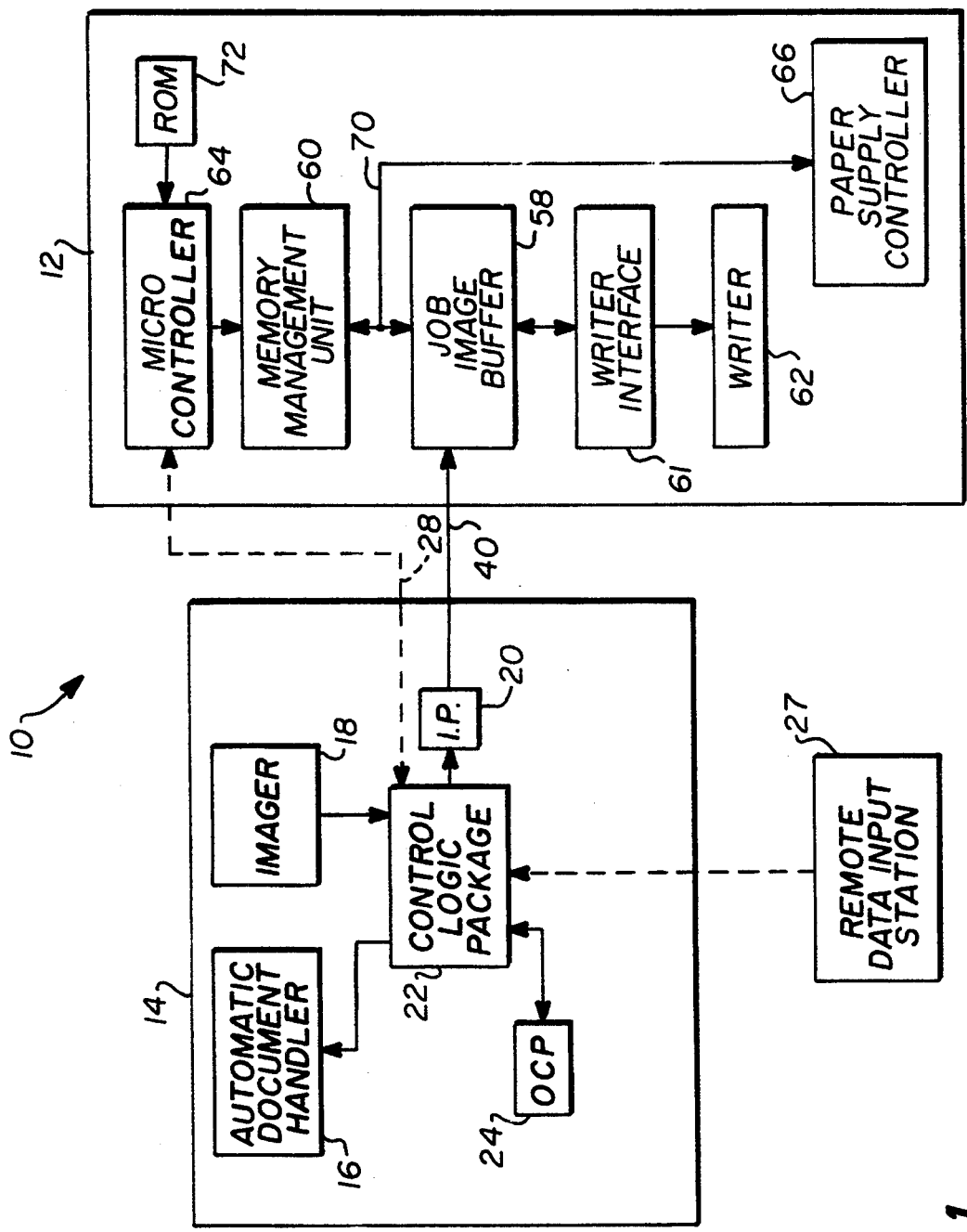
FIG. 1 is a block diagram of a copier apparatus according to a preferred embodiment of the present invention.

According to FIG. 1 and with reference to U.S. Pat. No. 5,109,252, a copier 10 includes a marking engine 12 and a document scanner assembly 14. Scanner assembly 14 comprises an automatic document feeder (ADF) or handler 16 such as, for example, a recirculating document feeder or other feeder that includes a hopper for storing a multisheet document original and feed rollers or belts for stream feeding document sheets seriatim past an optical scanner system and back to the hopper or to a second hopper. Focused light reflected from an original document sheet image is swept past an imager or scanner device 1-8 such as a linear array of photo transducers (photo diodes or charge coupled devices) for converting an image of the optical information on each original document sheet into electrical signals having values representative of the image density at associated pixel areas on the respective original document sheet.

As the scanning of the original document sheet proceeds in a direction perpendicular to the imager 18 and row of pixel areas, a series of output signals from the transducers are repetitively loaded into an associated shift register (not shown) and shifted out serially to provide a series of electrical signals having values representative of the image density of respective pixel areas in corresponding rows of pixel areas across the document image.

Scanner assembly 14 also includes a control logic package 22 having an integral data input station comprising an operator control panel 24 including buttons or input areas for the operator to input functions and to receive messages from the copier. Alternatively, setup instructions may be received via removable memory media or through signals provided from a remote data input station 27.

The logic package consists of control software, interface software and logic hardware, including one or more microprocessors. Setup instructions are input to the scanner, while synchronization signals to identify separate scan lines and to provide page information and marking engine control, as well as information for finishing and processing of jobs, will be sent to marking engine 12 via a job control communications link 28. The marking engine may comprise an ink jet, thermal, photographic or electrostatographic marking engine wherein a source of electrical signals modifies a writer to print images in accordance with electronic signals. Electrophotographic marking engines such as electrophotographic marking engines using LEDs or laser writers are preferred which modulate light with image data to record on a photoconductive recording medium. Modulated electrostatic images on the medium are developed with electroscopic toners and transferred to a record copy such as plain paper or plastic sheets; see for example U.S. Pat. No. 4,949,190, the pertinent contents of which are incorporated herein by reference. In a preferred embodiment, a grey level printhead is used such as an LED printhead wherein a multibit data signal representing density of each pixel to be recorded is output to the printhead to record pixels of varying grey levels in accordance with a multibit image data signal. An example of a grey level LED printhead is described in U.S. Pat. No. 5,126,759, the pertinent contents of which are incorporated herein by reference.

Figure 2:
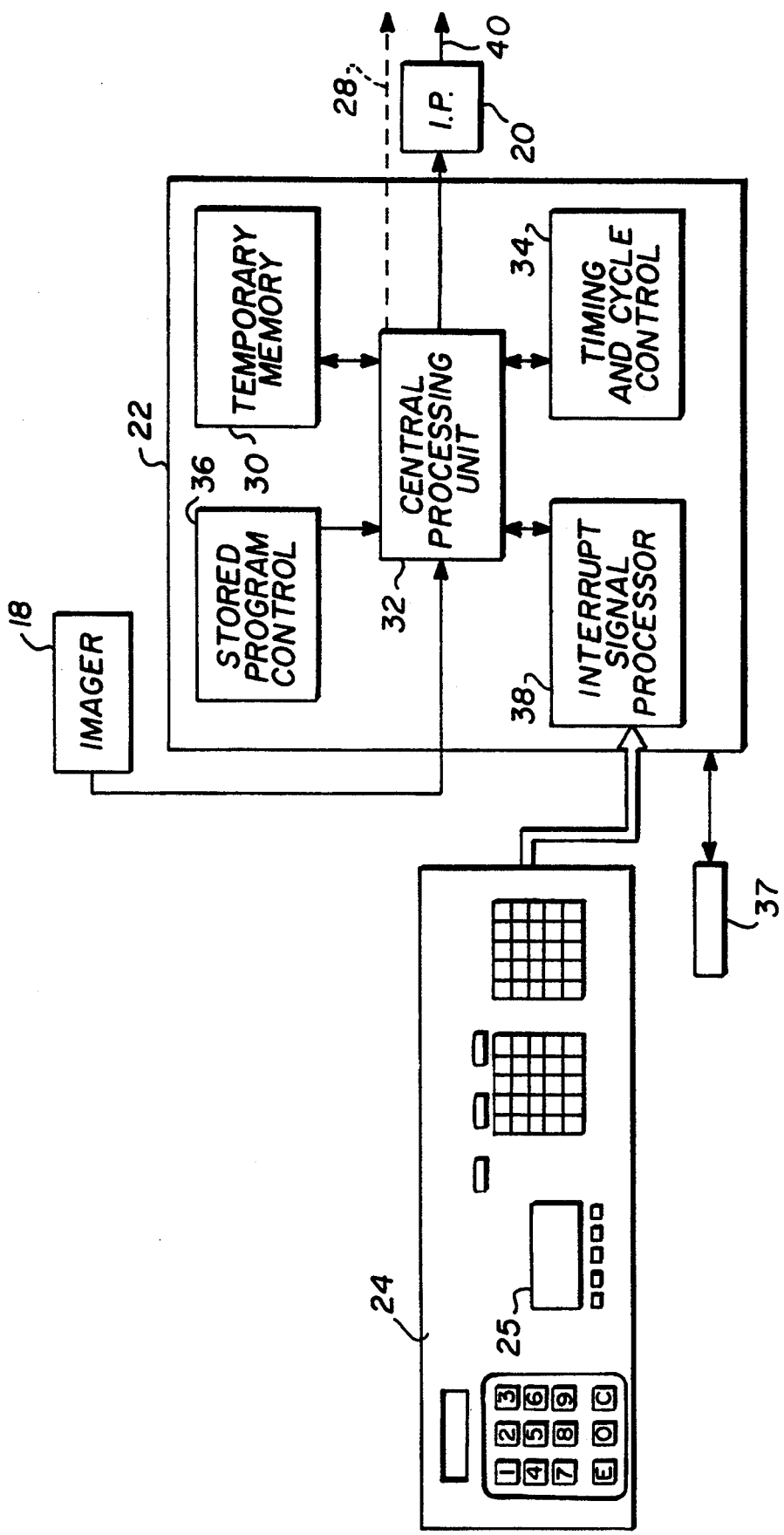
FIG. 2 is a schematic view illustrating in more detail portions of the copier apparatus of FIG. 1.

FIG. 2 includes a more detailed block diagram of control logic package 22 and operator control panel 9 (OCP) 24 with soft-key-provided LCD display screen 25. Display screen 25 provides text, graphics and soft-key selections. Messages and graphics are used to guide the operator through the various modes of operation explained below.

The control logic package comprises temporary data storage memory 30, central processing unit 32, timing and cycle control unit 34, and stored program control 36. Data input and output is performed sequentially under program control. Input data are received from imager 18 in the form of an 8-bits per pixel video stream of data. Setup and control signals are received either from operator control panel 24 or a removable memory. media 37 through an interrupt signal processor 38. The output data is applied through processing electronics 20 and an image data bus 40, and control signals are applied via control communications link 28, to marking engine 12.

Referring again to FIG. 1 marking engine 12 receives bit stream image data over bus 40 and job control data over a communications link 28, both for storage in a multiple page buffer memory 58. The page buffer will accept electronic image data from scanner 14 and store that data until needed by a writer 62. The storage media is preferably a dynamic random access memory under the control of a memory management unit 60.

Control means, including a microcontroller 64 is arranged to perform arithmetic and logic operations and instruction decoding as well as controlling the time allocation of peripherals (such as a paper supply controller 66 and accessories communications for finishers, staplers, exit hoppers, etc.) through a machine control communications link 70. Several output functions may be available for receiver sheets including selection for output trays, stapling, sorting, folding, finishing, mailbox, envelope receiver, etc.

Microcontroller 64 has associated with it RAM for storing image location addressed, and a read-only memory 72 in which is storm various fixed forms such as test patterns, density patch patterns for process control purposes, billing forms, etc.

Figure 3:
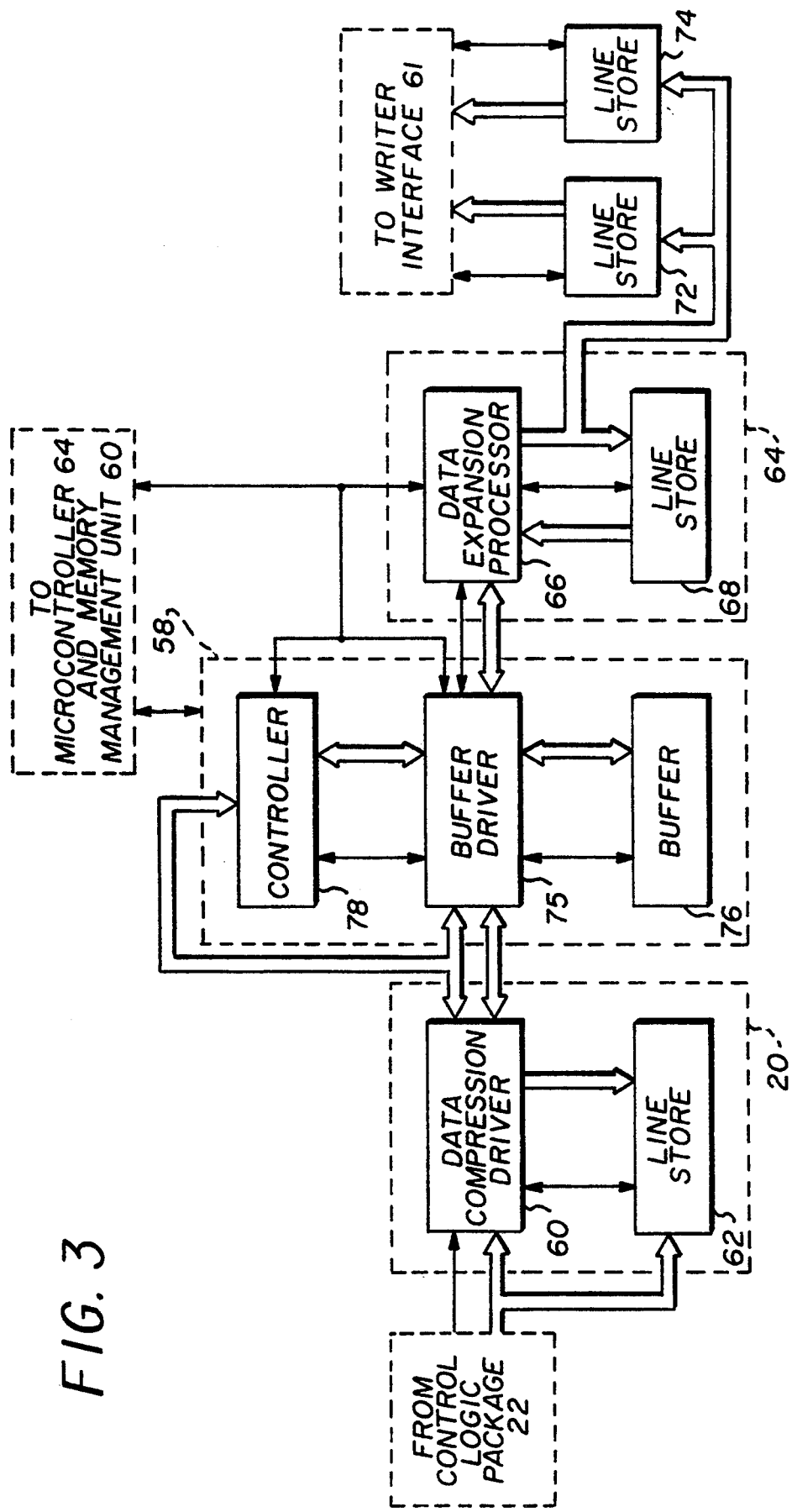
FIG. 3 is a schematic illustrating in more detail a job image buffer illustrated in FIG. 1.

With reference to FIG. 3, the image processor 20 may include a data compressor which receives the image data stream from imager 18. Data compressor is preferably a hardware implementation of an appropriate algorithm which encodes redundant information into a more compact form before passing the compressed data stream to a multi-page buffer memory 58. A preferred compression algorithm is CCITT Group IV, known to those skilled in the art but other forms of data compression are available, and reference is made to Data Compression by Gilbert Held, 1983, John Wiley and Sons, for examples of various compression techniques. The data compressor includes a data stream compression driver 60 and a line store 62 for buffering a full line's worth of data.

A data expander 64 is the companion to the data compressor, and it includes a data expansion processor 66 and a line store 68. The expander retrieves the compressed data stream from multi-page buffer memory 58 and reconstructs the output data into original form for a writer interface 61. The writer interface receives a full line of image data from the data expander as the line is processed, and has a pair of line stores 72 and 74 and random logic to resequence the data stream before sending it to printhead or writer 62.

Multi-page buffer memory 58 is provided for storing image data to permit the electronic recirculation of images for collation; thereby eliminating the need for a mechanical recirculating document handler. The heart of the multi-page buffer memory is a large bank of dynamic random access memory (DRAM) in a buffer 76 for storage of the image data as it is processed by data compressor 20.

Controller 78 and buffer driver 75 act as a direct memory access controller, allowing data compressor 20 and expander 64 direct access to DRAM buffer 76 without a microprocessor, and as a DRAM controller arbitrating between memory read, write and refresh cycles.

The microcontroller 64 functions as the system manager, overseeing the overall operation of the multi-page buffer memory, the microcontroller will handle communication with a logic and control unit (LCU) (not shown) of the marking engine, store the internal pointers identifying the beginning and ending addressed for each image, initiate transfers from the scanner assembly 14 and control the data compression and expansion process. The microcontroller and LCU comprise electronic collation means for presenting the stored image data for printing in the proper sequence, as often as it needed to produce the desired number of collated document sets whereby a plurality of electronically collated, multipage sets can be printed as known in the prior art.

Figure 4B:
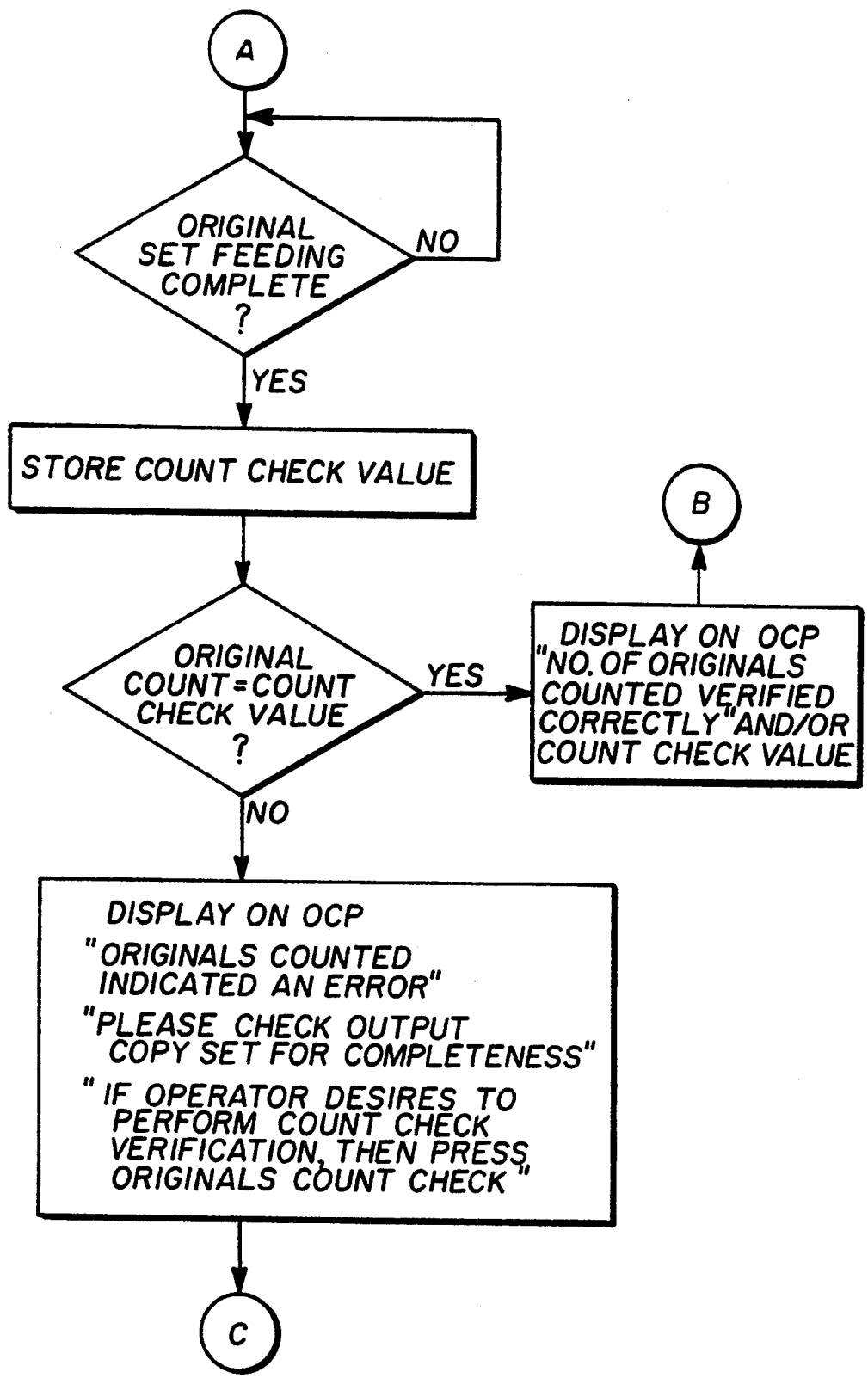

With reference to FIGS. 4A and 4B and assuming an operator has placed an original multisheet document set to be copied into a document feed hopper and set up the parameters for a copy job, e.g., number of copies for reproducing the document set and other conventional parameters, the control logic package 22 is programmed to operate as set forth below. In response to pressing of the "start" button on the OCP 24, a decision is made as to whether or not documents are in the automatic document feeder (ADF). As noted above, the ADF may be a recirculating document feeder (RDF) wherein documents that are stored in a hopper are circulated to an exposure platen in serial fashion and returned to the hopper. At the exposure platen which is part of imager 18, the document sheets are scanned or read during this first sheet feeding operation to generate electronic signals representing the density of image information on the sheets. The ADF may also be a feeder where the documents are presented serially and automatically to the platen and are then fed to a stack or hopper at a different location from which originally presented. In any event, if documents are sensed by suitable known sensors to indicate that this is an ADF job, scanning of the originals in serial fashion for image information is made by the scanner. The scanner may also include scanning for automatic document recognition (ADR), see U.S. Pat. No. 4,922,350, which describes a prescan for ADR determination. As the document sheets are fed seriatim to or from the scanner, a count is made by well known means of the number of document sheets fed during this first sheet feeding operation. When the scanning of the originals is complete, the number of originals in this copy job is stored and displayed on the display screen 25. There is also displayed an indication that processing for printing of the requested number of copy sets has begun. This processing can include subjecting the incoming data to edge enhancement and/or compression, the latter to make efficient use of memory space in buffer 76. The OCP also displays a prompt requesting if verification is desired and instructions for accomplishing these objections. For example, the prompt would say "please put originals in ADF hopper and press originals count check." Where the ADF is an RDF, the instruction need only inform the operator to press the appropriate button, soft key or touch screen area of a touch screen display for requesting a count check.

Assuming a count verification check has been requested and the document originals are returned to the appropriate hopper for feeding, the document sheets are again fed seriatim to the platen as previously, but no scanning of documents is made. The document sheets on this copy job are simply counted and the second count value is storm in memory and compared with the original count. If the stored count values from the two runs are equal, the display provides a confirmatory message; if not, the error is noted on the display and the operator is given a prompt to indicate that the documents can be circulated or run through the feeder a third time and a comparison will be made of the count from the third run with that of the original. The count values of the second and subsequent feeding operations may also be displayed.

It will be noted from the above that substantially no productivity time is lost because the copier is processing the original job while the copier is making a verification check. This processing would include outputting of the compressed data from buffer 76 and expanding the data for output to the writer 62 for printing by the marking engine.

Figure 5A:
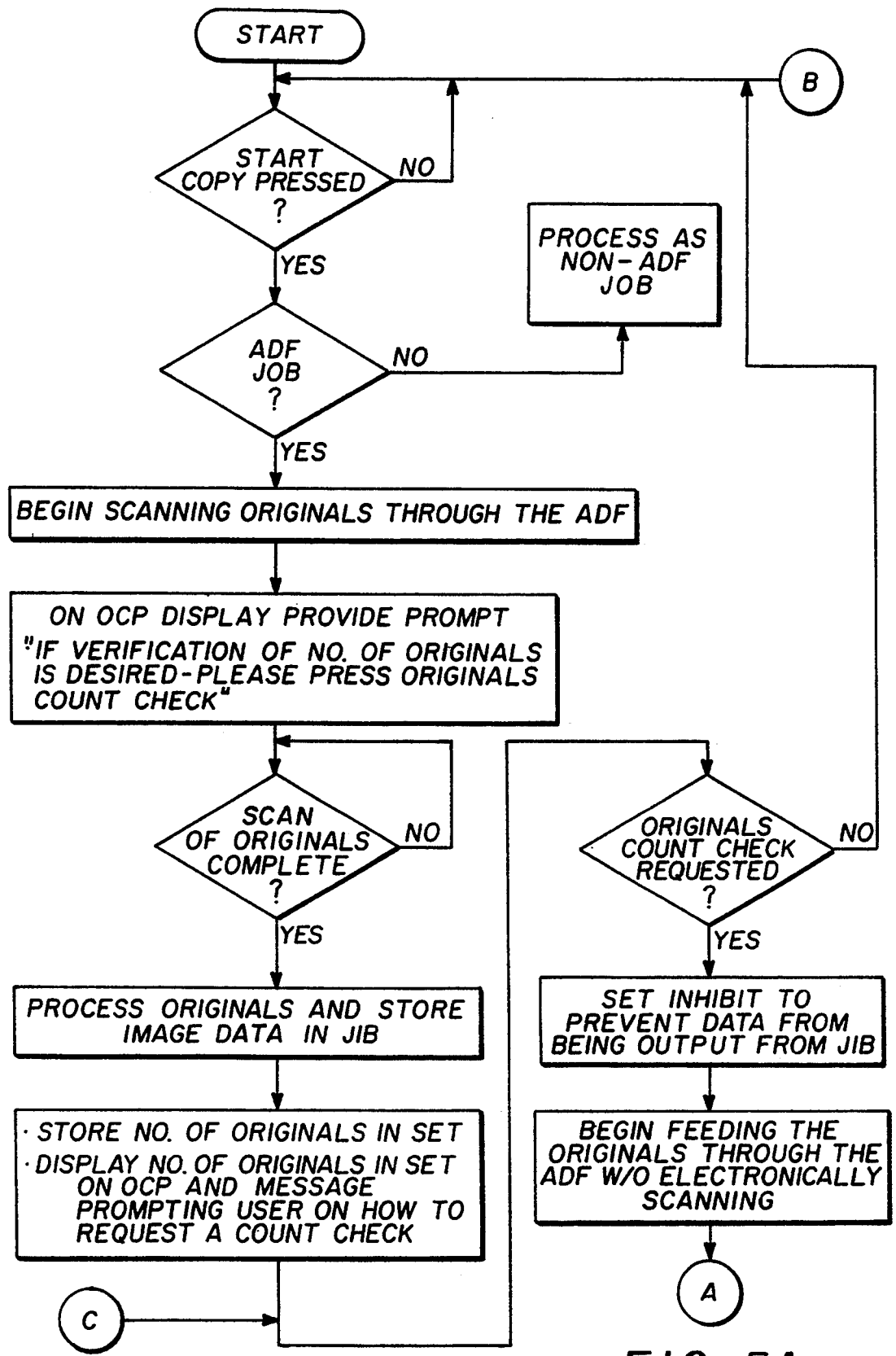
FIGS. 5A and 5B illustrate a flowchart for operation of the copier apparatus of FIG. 1 in accordance with a second embodiment of the invention.
Figure 5B:
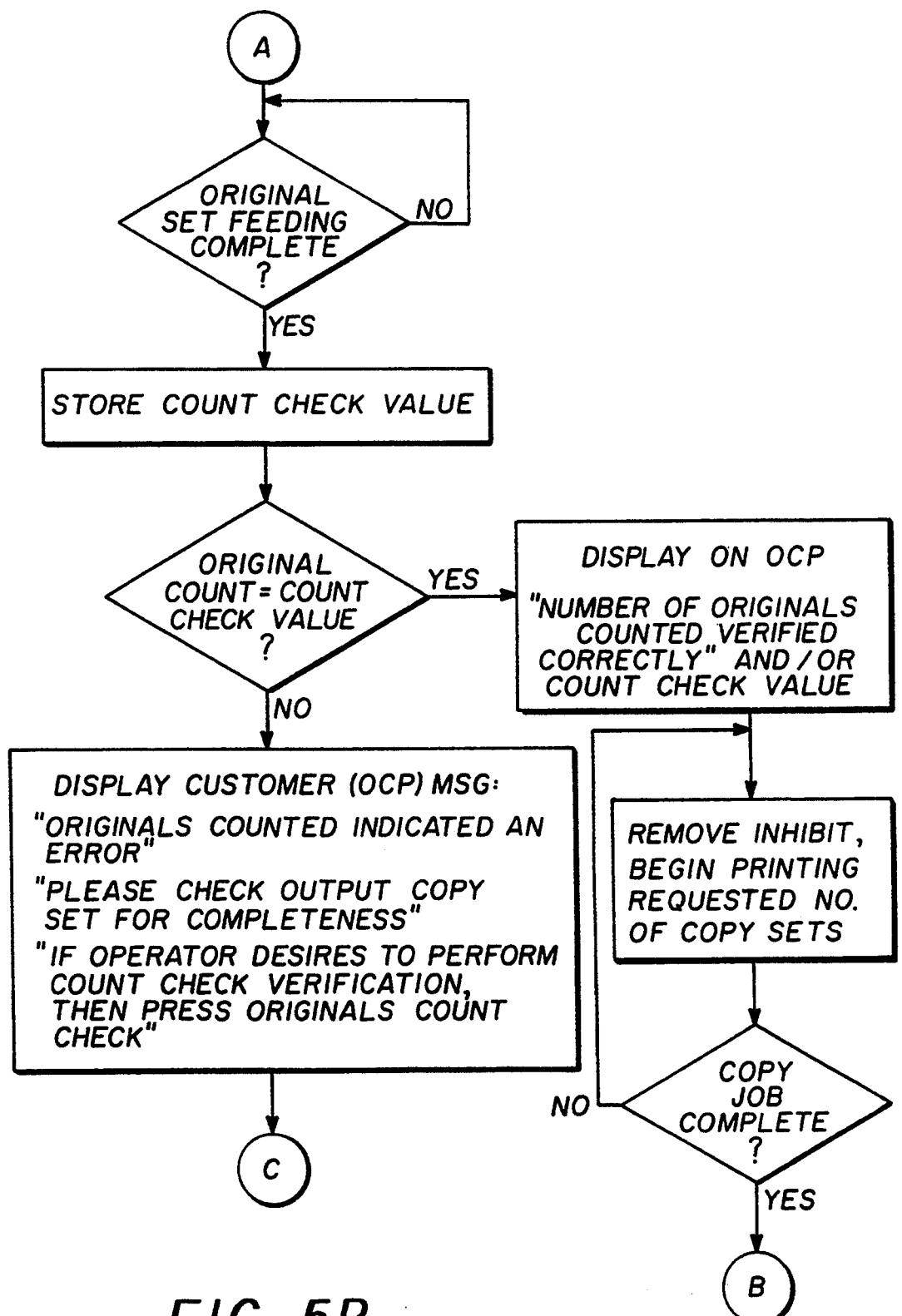

In order to eliminate the production of copy during misfeeds, the invention contemplates (see flowchart FIGS. 5A and 5B) that in an alternate embodiment the prompt could be provided during scanning of the documents on the original pass so that if such request is initiated at that time, an inhibit will be set by the controller 78, so that while image data will be processed to compress and store same in buffer 76 no copy is produced until a verification check affirms that no misfeed has occured. If an RDF is used and after the original scan is complete and a verification is requested, a second feed is automatically made for counting purposes only through the RDF feed path, i.e., from hopper to platen back to hopper. The count determined from the second feed is compared with that of the first; if they match, the controller 78 is provided with a signal from the control logic package 22 via the microcontroller 64 that the inhibit is to be removed and the buffer driver 75 controls output of data from the buffer 76 for producing the requested number of sets of copies. As noted above, data is able to be read from buffer 76 plural times to produce the commensurate plural number of collated copy sets requested. Thus, if the original copy job is a document of M sheets simplex (M is a whole number greater than 1) the buffer 76 outputs the data in page order (either 1 to M or M to 1) each of N number of times (N is a whole number equal to or greater than 1 and is the number of requested copy sets in the copy job) for printing one or plural collated copy sets of the original document.

ADVANTAGES

There has thus been described an improved electronic copier apparatus and method of copying which features verification of proper document feed. Such verification is provided without loss of productivity time as it is provided during processing of data for printing.

In accordance with the invention when a copy job is to be printed, the operation of the copier is as described in the prior art except that the control logic package will enable the OCP 24 to display a prompt that asks if a second circulation is desired as a check or parity count. The screen 25 may be a touch screen or have soft keys associated therewith that allow the operator to input a request for this second circulation. Alternatively, a numerical code may be input on a dedicated button pressed for starting the second feed or even a second pressing of the start button on the copier. In response to pressing the appropriate button for starting the second circulation, the control logic package causes the second circulation to occur (see flowchart FIGS. 4A and 4B ) while the marking engine is producing copies of the document as scanned during the first scan. Thus, the documents are fed by the ADF a second time without electronically scanning them for image information to generate a second count of the number of document sheets in the copy job. A comparison is made to determine if the number of originals counted in the initial scan matches with that of the second count. In essence, this would be a parity check. If a count mismatch occurred, the OCP would prompt the operator that a mismatch had occurred and to check his output copy set. If an error was detected then all of the sets made would be identified as invalid.

The invention has been described in detail with particular reference to preferred embodiments thereof and illustrative examples, but it will be understood that variations and modifications can be effected within the spirit and scope of the invention.

I claim:

1. An electrostatographic copier apparatus for producing copies of an original multisheet document set, the apparatus comprising:
   means for inputing parameters for reproduction of the document set as a copy job;
   means for feeding document sheets from said set seriatim to an image reader means and then to a storage hopper during a first sheet feeding operation;
   means responsive to said feeding for counting the sheets a first time and for providing a first count of the number of document sheets counted in said document set during the first sheet feeding operation;
   image reader means operative during the first sheet feeding operation for reading optical image information on the document sheets and converting the optical image information read to electronic image data;
   electrostatographic reproduction means for printing image data on copy sheets;
   means for feeding the document sheets during a second sheet feeding operation;
   means for counting the sheets in said document set during said second sheet feeding operation and for generating a second count without reading of the optical image information on the document sheets during said second sheet feeding operation; and
   means for processing the image data for printing during said second sheet feeding operation.

2. The apparatus of claim 1 and including display means for displaying a prompt indicating that an operator has a choice allowing selection of a document sheet count verification operation; and
   means allowing input by an operator of a selection of a count verification operation for initiating the second sheet feeding operation.

3. A method for producing copies of an original multisheet document set on an electrostatographic copier apparatus, the method comprising:
   establishing parameters for reproduction by said apparatus of the document set as a copy job;
   feeding document sheets from said set seriatim to an image reader and then to a storage hopper during a first sheet feeding operation;
   operating the apparatus so that the apparatus counts the sheets a first time and provides a display indicating a first count of the number of document sheets counted in said document set during the first sheet feeding operation;
   during the first sheet feeding operation reading optical image information on the document sheets and converting the optical image information read to electronic image data;
   processing the data for printing by the apparatus;
   operating the apparatus to electrostatographically reproduce the data on copy sheets;
   feeding the document sheets during a second sheet feeding operation; and
   operating the apparatus so that the apparatus counts the sheets in said document set during said second sheet feeding operation and generates a second count without reading of image information on the document sheets during said second sheet feeding operation and wherein during said second sheet feeding operation at least a portion of said step of processing the data for printing is performed.

4. The method of claim 3 and including displaying a prompt indicating that an operator has a choice allowing selection of a document sheet count verification operation and, in response to input by an operator of a selection of a count verification operation, initiating the second sheet feeding operation.

5. A copier apparatus for producing copies of an original multisheet document set, the apparatus comprising:
   means for inputing parameters for reproduction of the document set as a copy job;
   means for feeding document sheets from said set seriatim to an image reader means and then to a storage hopper during a first sheet feeding operation;
   means responsive to said feeding for counting the sheets a first time and for providing a first count of the number of document sheets counted in said document set during the first sheet feeding operation;
   image reader means operative during the first sheet feeding operation for converting optical information on the document sheets to electronic image data;
   means for processing the data for printing;
   means for printing the data on copy sheets;
   means for feeding the document sheets during a second sheet feeding operation;
   means for counting the sheets in said document set during said second sheet feeding operation and for generating a second count without reading of image information on the document sheets during said second sheet feeding operation; and display means for displaying a prompt indicating an operator has a choice allowing selection of a document sheet count verification operation; and means allowing input by an operator of a selection of a count verification operation for initiating the second sheet feeding operation.

6. The apparatus of claim 5 and wherein the processing means includes means for compressing the image data and buffer means for storing the image data in compressed form.

7. The apparatus of claim 6 and including means for inhibiting printing of image data until the second count is verified with the first count.

8. The apparatus of claim 5 and including means for inhibiting printing of image data until the second count is verified with the first count.

9. The apparatus of claim 5 and including means for comparing the first count with the second count and for displaying a message that the counts do not match.

10. The apparatus of claim 9 and wherein the processing means provides electronic collation of image data and cooperates with the printing means to form plural collated copy sets of the original document.

11. The apparatus of claim 10 and wherein the processing means includes means for compressing the image data and buffer means for storing the image data in compressed form.

12. The apparatus of claim 5 and wherein said means for processing the data for printing performs at least a portion of said processing during said second sheet feeding operation.

13. A method for operating a copier apparatus for producing copies of an original multisheet document set, the method comprising:

establishing parameters for reproduction by said apparatus of the document set as a copy job;

feeding document sheets from said set seriatim to an image reader and then to a storage hopper during a first sheet feeding operation;

operating the apparatus so that the apparatus counts the sheets a first time and provides a display indicating a first count of the number of document sheets counted in said document set during the first sheet feeding operations;

during the first sheet feeding operation reading optical image information on the document sheets and converting the optical image information read to electronic image data;

processing the data for printing by the apparatus;

printing the data on copy sheets; and feeding the document sheets during a second sheet feeding operation;

operating the apparatus so that the apparatus counts the sheets in said document set during said second sheet feeding operation and generates a second count without reading of image information on the document sheets during said second sheet feeding operation; and displaying a prompt indicating that an operator has a choice allowing selection of a document sheet count verification operation and, in response to input by an operator of a selection of a count verification operation, initiating the second sheet feeding operation.

14. The method of claim 13 and including compressing the image data and storing the image data in compressed form.

15. The method of claim 14 and including inhibiting printing of image data until the second count is verified with the first count.

16. The method of claim 13 and including inhibiting printing of image data until the second count is verified with the first count.

17. The method of claim 13 and including comparing the first count with the second count and for displaying a message that the counts do not match.

18. The method of claim 17 and including electronically collating image data and in response to said electronic collation printing plural collated copy sets of the original document set.

19. The method of claim 18 and including compressing the image data and buffer means for storing the image data in compressed form.

20. The method of claim 13 and wherein during said second sheet feeding operation at least a portion of said step of processing the data for printing is performed.

* * * * *